J. C. PEWTHER.
TRAP.
APPLICATION FILED SEPT. 25, 1916.

1,222,024.

Patented Apr. 10, 1917.

Fig. 1

Fig. 2

Inventor
JUDSON C. PEWTHER

By Watson E. Coleman
Attorney

UNITED STATES PATENT OFFICE.

JUDSON C. PEWTHER, OF OSWEGO, OREGON.

TRAP.

1,222,024.　　　　　　Specification of Letters Patent.　　　Patented Apr. 10, 1917.

Application filed September 25, 1916. Serial No. 122,089.

*To all whom it may concern:*

Be it known that I, JUDSON C. PEWTHER, a citizen of the United States, residing at Oswego, in the county of Clackamas and State of Oregon, have invented certain new and useful Improvements in Traps, of which the following is a specification, reference being had to the accompanying drawings.

This invention relates to traps and more particularly to traps designed for use in catching burrowing animals. Traps of this character have to be inserted in burrows and one of the objects of this invention is to provide a trap which may be set within a burrow without danger of the trap being sprung and to this end to provide a trap so constructed that the jaws may be set in an open position without tensioning the spring which is used for causing a retraction of the jaws and then after the trap has been inserted in the burrow the spring may be tensioned.

A further object of the invention is to provide a trap which is so constructed that it will take up the least possible room within the burrow and form the least possible impediment to the movement of the animal along the burrow and to this end to form the trap with a single longitudinally extending element or elements from which the jaws, when open, project on opposite sides and thus do away with the ordinary frame upon which the jaws are supported, which frame forms an obstruction to the passage of an animal along the burrow, and a further object of the invention is to so construct the trip plate that it may be swingingly mounted upon this longitudinally extending element or elements and adjustably mounted thereon.

The invention consists in the details of construction and in the combination and arrangement of the several parts of my improved trap whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in perspective of a trap constructed in accordance with an embodiment of my invention with the jaws in set position and a second position of the trigger indicated by dotted lines; and Fig. 2 is a view in perspective of the pivoted jaw as herein disclosed, detached.

As disclosed in the accompanying drawings, 1 denotes a metallic rod of requisite gage and which has one end portion bent to form the upwardly directed loop 2, while the opposite extremity of the rod 1 is bent to form the laterally disposed loop 3 and then extended beyond the opposite side of the rod to form the jaw 4 extending in the opposite direction as the loop 2, said jaw 4 being stationary relative to the strand 1.

5 denotes a second jaw rod 1 and having its inner end portion coiled as at 6 to afford a barrel through which the rod 1 loosely passes, whereby the jaw 5 is capable of rocking or swinging movement. The barrel 6 is also provided with the laterally extended loop 7 with which is operatively engaged one end of the coil spring 8 encircling the rod 1.

The opposite end portion of the spring 8 is provided with the lateral extension 9 terminating in a hook 10 whereby the same may be detachably engaged with the loop 2 so that when so engaged the spring 8 coacts with the loop 7 to urge the jaw 5 in a direction toward the jaw 4. It will be perceived that by turning the extension 9 around the rod 1 the tension of the spring 8 may be materially increased. In practice it has been found that one turn of the extension 9 is ordinarily sufficient to properly tension the spring for ordinary purposes but as the spring loses its resilience this tension may be again increased by giving another turn of the extension 9 around the rod 1. It is to be noted that the spring surrounds the rod 1 and is concentric thereto so that it is possible to rotate the free end of the spring around the rod 1 as a pivot which it would not be possible to do if the rod 1 and the spring were not concentric to each other.

Pivotally engaged with the loop 3 is the trigger 11 provided at its pivoted end portion with the inwardly disposed finger 12 adapted to overlie the jaw 5 to maintain the same in an open or set position. In setting this trap, the spring 8 has its tension relaxed by disengaging the extension 9 from the loop 2. The jaws 4 and 5 may then be opened freely as there is no tension urging these jaws to a closed position. The jaws are open and the latch 12 is engaged over the jaw 5 and the extremity of the trigger 11 is engaged in the opening 14 of the trip plate 15. After this has been done the trap may be inserted in a burrow with the members 2 and 9 at the opening of the burrow and then the member 9 may be shifted to a vertical position which will tension the spring and the member 9 engaged with the loop 2. This tensions the spring 8 and causes the spring to urge the jaws toward each other.

The trip plate 15 is provided with a relatively large opening 16 through which the rod 1 and the spring 8 are loosely disposed and the upper portion of the plate 15 has struck therefrom the upstanding tongue 17, said tongue 17 affording a means whereby bait may be attached to the plate. It will be noted that the relatively large opening 16 constitutes means for swingingly mounting the trip plate 15 upon the spring 8. If this opening 16 were small and the spring 8 was not loosely disposed through the opening, the trip plate 15 could not swing but would bind upon the convolutions of the spring 8. It will also be noted that as the spring 8 closely encircles the rod 1, there is no means of pivotally mounting the trip plate 15 upon this rod 1 or upon the spring 8 other than that shown. The opening 16, therefore, permits the trip plate to swing as on a hinge so that its upper end may be shifted toward the extension 9 and thus the latch or trigger 11 released. It also constitutes means whereby the trip plate may be shifted along the rod 1 to hold the jaws open without danger of detachment from the trigger 11 if so desired.

With the trap set it will be perceived that as the animal endeavors to take the bait carried by the plate 15, the plate 15 will be caused to rock rearwardly, whereupon the trigger 11 will be released and the animal consequently impaled between the jaws 4 and 5.

From the foregoing description, it is thought to be obvious that a trap constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A trap comprising a rod having a jaw at one end, a spring coiled around the rod, a jaw operatively mounted on the rod for rotation therearound and engaged by one end of the spring, means for detachably holding the ends of the rod and the spring remote from the jaws from relative movement and the spring under tension, and animal releasable means for holding the jaws open against the tension of the spring.

2. In a trap, a pair of coacting jaws operatively pivoted to each other, one of the jaws having a rod forming its pivotal axis, the rod having a radial arm, a coiled spring surrounding the rod operatively engaging at one end with the opposite jaw and at its other end formed with a radial arm having means for detachably engaging the first named arm, the arm and the adjacent end of the spring being rotatable completely around said rod, and animal releasable means for holding the jaws open against the tension of the spring.

3. In a trap, a pair of coacting movable jaws, a spring connected at one end to one jaw, a latch adapted to hold the jaws in open position and against relative movement, a member at the other end of the spring adapted to be rotated a plurality of times to place said spring under variable tension, and means connected to and movable with the other jaw for engaging said member and holding it from reverse rotation under the tension of the spring.

4. A trap of the class described comprising an elongated member provided at one end portion with a laterally directed jaw and at its opposite end portion with an extension, a second jaw coacting with the first named jaw and provided with a barrel through which the elongated member is loosely directed whereby said second jaw is capable of pivotal movement, a lateral extension carried by the barrel, a spring encircling the elongated member and secured at one end portion to the extension of the barrel, the opposite end portion of the spring being provided with an extension detachably engageable with the extension of the elongated member whereby the tension of the spring may be varied, and releasable means for maintaining the second jaw in set position.

In testimony whereof I hereunto affix my signature.

JUDSON C. PEWTHER.

Copies of this patent may be obtained for five cents each, by addressing the "Commissioner of Patents, Washington, D. C."